(12) United States Patent
Petersen et al.

(10) Patent No.: US 7,137,334 B2
(45) Date of Patent: Nov. 21, 2006

(54) DEVICES, SYSTEMS AND METHODS FOR THAWING, HEATING AND/OR GLAZING PREVIOUSLY FROZEN BAKED GOODS OR DOUGH-BASED PRODUCTS

(75) Inventors: Larry Petersen, Newcastle, WA (US); Michael Porter, Renton, WA (US); Michael Bontatibus, Mercer Island, WA (US)

(73) Assignee: Belshaw Bros., Inc., Seattle, WA (US)

( * ) Notice: Subject to any disclaimer, the term of this patent is extended or adjusted under 35 U.S.C. 154(b) by 328 days.

(21) Appl. No.: 10/265,078

(22) Filed: Oct. 4, 2002

(65) Prior Publication Data

US 2004/0067292 A1 Apr. 8, 2004

(51) Int. Cl.
*A21C 9/04* (2006.01)

(52) U.S. Cl. .................. 99/354; 99/355; 99/443 C; 118/20; 118/23

(58) Field of Classification Search .............. 99/352, 99/354, 355, 443 R, 443 C; 118/13, 20, 118/23
See application file for complete search history.

(56) References Cited

U.S. PATENT DOCUMENTS

| | | | | |
|---|---|---|---|---|
| 2,472,454 A | | 6/1949 | Ackles ........................... 91/2 |
| 2,525,306 A | | 10/1950 | Lunsford ........................ 91/2 |
| 3,649,812 A | * | 3/1972 | Wilson ......................... 219/396 |
| 3,734,740 A | * | 5/1973 | Zenos .......................... 426/383 |
| 3,882,768 A | * | 5/1975 | Troisi et al. ..................... 99/352 |
| 4,048,984 A | * | 9/1977 | Eberhardt .................... 126/337 R |
| 4,061,314 A | * | 12/1977 | Schmader ...................... 366/145 |
| 4,103,606 A | * | 8/1978 | Gitcho ...................... 99/443 C |
| 4,440,071 A | * | 4/1984 | Boosalis et al. ............... 99/339 |
| 4,548,130 A | * | 10/1985 | Diener et al. ................. 99/345 |
| 4,568,552 A | * | 2/1986 | Persson ....................... 426/523 |
| 4,793,473 A | * | 12/1988 | Gilgore et al. .............. 198/845 |
| 4,962,695 A | * | 10/1990 | Northrup, Jr. ................ 99/339 |
| 5,065,670 A | | 11/1991 | Leiweke ....................... 99/405 |
| 5,109,761 A | * | 5/1992 | Gray ........................... 99/517 |
| 5,249,665 A | * | 10/1993 | Silzer et al. ........... 198/867.14 |
| 5,271,316 A | * | 12/1993 | Wisting ....................... 99/420 |
| 5,313,036 A | | 5/1994 | Chartrain et al. ........... 219/685 |
| 5,320,210 A | * | 6/1994 | Van Den Bergh et al. .................... 198/465.1 |
| 5,541,390 A | * | 7/1996 | Pinceloup .................. 219/701 |
| 6,010,016 A | | 1/2000 | Siegal ........................ 211/126 |
| 6,119,586 A | * | 9/2000 | Gongwer ..................... 99/345 |

(Continued)

FOREIGN PATENT DOCUMENTS

GB 909127 10/1962

(Continued)

OTHER PUBLICATIONS

Bamford, R., "Freezing and Thawing of Bakery Products," *Baker's Digest* 49(3):40-43, Jun. 3, 1975.

*Primary Examiner*—Drew Becker
(74) *Attorney, Agent, or Firm*—Seed IP Law Group PLLC

(57) ABSTRACT

Devices, systems and methods for thawing, heating and/or glazing previously frozen baked goods and other dough-based products, wherein the products can be thawed in an environment having a selected temperature and elevated humidity; the conveyor is configured to prevent early and excessive insertion of the products into the oven; the oven is configured to heat the products to greater than a selected surface temperature; and wherein the glazer is configured to apply glaze to the products when the surface temperature of the product is within a desired range.

10 Claims, 7 Drawing Sheets

U.S. PATENT DOCUMENTS 6,327,968 B1 * 12/2001 Scannell ..................... 99/353
6,755,149 B1 * 6/2004 Herman ..................... 118/13

FOREIGN PATENT DOCUMENTS

| JP | 5-168396 | 7/1993 |
| JP | 5-316926 | 12/1993 |
| JP | 11266772 | 10/1999 |
| WO | WO 99/48373 | 9/1999 |
| WO | WO 00/35290 | 6/2000 |

* cited by examiner

DEVICES, SYSTEMS AND METHODS FOR THAWING, HEATING AND/OR GLAZING PREVIOUSLY FROZEN BAKED GOODS OR DOUGH-BASED PRODUCTS

BACKGROUND OF THE INVENTION

1. Field of the Invention

The present invention is directed toward donut and baked goods processing equipment, and more particularly, to devices, systems, and methods for thawing, heating and/or glazing previously frozen donuts or baked goods.

2. Description of the Related Art

Donuts and similar baked goods are extremely popular food products, and are becoming even more popular. As outlets providing freshly made donuts become more popular, the demand for donuts, both fresh and packaged, also increases.

In an effort to meet this increasing demand, retail outlets with labor limitations without equipment for baking or frying fresh baked goods and donuts are looking for ways to provide their customers with the best alternatives. Many retail outlets purchase frozen donuts and allow them to thaw at ambient temperature or in a refrigerated environment. After the donuts have thawed, they are placed on a tray and heated in either a rack oven or a conveyor oven. Finally, if desired, the donuts can be moved onto a glazing screen and glazed, iced and/or filled. One example of such a process and the associated equipment can be seen at International Publication No. WO 99/48373.

Although the new systems and processes for thawing, heating and finishing previously frozen donuts are an improvement over their own prior art, they themselves could stand to be improved in many ways. For example, the WO 99/48373 system requires each donut to be manually transferred at least two times, which can be time-consuming and can damage the donut or its finish. Also, thawing donuts in a refrigerator, even inside a plastic bag, causes the donuts to lose moisture, resulting in less desirable end products. Still further, because each donut is transferred after it leaves the oven from a tray to a glazing screen—or is heated on a rack with many other trays of donuts—before it is glazed, the temperature of the donuts varies between the time it leaves the oven and the time it his glazed, which adversely affect the consistency and quality of the glazing on the final product. These and other shortcomings have been reported in association with the state of the art in reheating and glazing previously frozen donuts and baked goods.

BRIEF SUMMARY OF THE INVENTION

The present invention is generally directed toward devices, systems, and methods for thawing frozen donuts and baked goods and/or for heating and/or glazing the same. In the present disclosure, the term "donut" and "baked good" are used interchangeably to mean any fried or baked dough-based product, such as donuts, cinnamon rolls, cakes, muffins, croissants, etc.

In one particular embodiment, the invention comprises a method including the steps of creating a thawing environment with a relative humidity between 60 and 80 percent, and a temperature between 80 and 110° F.; manually or automatically inserting the goods into the thawing environment; and leaving them in the thawing environment for at least 20 min. Thawing the products in this environment, as opposed to the prior art thawing environment, prevents the end products from having reduced moisture content.

In an alternate embodiment, the present invention is directed toward a method incorporating placing the baked goods onto a glazing screen; placing the glazing screen into a thawing environment, such as that described above, for at least 20 min.; moving the glazing screen from the thawing environment to a conveyor oven; and driving the glazing screen through the conveyor oven to heat the donuts. Yet another embodiment of the invention further incorporates the step of applying glaze to the baked goods after they leave the conveyor oven and, in particular embodiments, when the surface temperature of the baked good is between 160° F. and 180° F.

Another embodiment of the present invention prevents the operator from inserting the baked goods into the conveyor oven before the conveyor oven is ready. One embodiment of that invention incorporates the steps of providing a track routed through the conveyor oven; preheating the oven to a desired temperature while the track remains stationary; and, after the oven is preheated to a desire temperature, starting the track and allowing the operator to use the conveyor oven to heat baked goods. In alternate embodiments of this invention, the track comprises projections that prevent the operator from sliding the glazing screen along the track into the conveyor oven.

The present invention is also directed toward a system for heating baked goods. One embodiment of the system incorporates an oven and a track. The track extends through or parallel to a passageway in the oven, and is operable to drive a glazing screen through the conveyor oven. The track incorporates lateral projections spaced apart from each other along the length of the track. The lateral projections extend outwardly from the loop of track such that they engage the glazing screen during use. The lateral projections are configured to both drive the glazing screen through the conveyor oven and to prevent the glazing screen from being prematurely inserted into the oven.

The present invention is also directed toward a system for heating and glazing baked goods. One embodiment of the system incorporates an oven and a track similar to that discussed above. It also incorporates a glaze applicator configured to drizzle glaze over the baked goods. The glaze applicator is positioned downstream of the oven at a location selected to apply the glaze to the donut when the surface of the donut is at a temperature between 160 and 180° F.

The present invention is also directed toward a drive gear for a glazing screen conveyor. In one embodiment, the drive gear incorporates a central opening for mating with a rotating drive shaft, and a compound perimeter for engaging the glazing screen. The compound perimeter has several radial projections extending outward about the perimeter of the drive gear, the projections being circumferentially spaced apart from each other. Each projections has a circumferential groove on its outer surface to mate with a complementary structure on the glazing screen.

BRIEF DESCRIPTION OF THE SEVERAL VIEWS OF THE DRAWING(S)

DETAILED DESCRIPTION OF THE INVENTION

The present detailed description is directed toward devices, systems, and methods for thawing, heating, and/or glazing donuts and baked goods. Embodiments of the present invention can allow an individual to thaw, heat, and/or glaze donuts that had previously been frozen, and to create an end product that is of extremely high quality and desirability. Several details and certain embodiments of the invention are set forth in the following description and are illustrated in FIGS. 1 through 10 to provide a thorough understanding of those embodiments. One skilled in the art, however, will understand that the present invention may have additional embodiments and may be practiced without several of the details described and/or illustrated.

Figure 1:
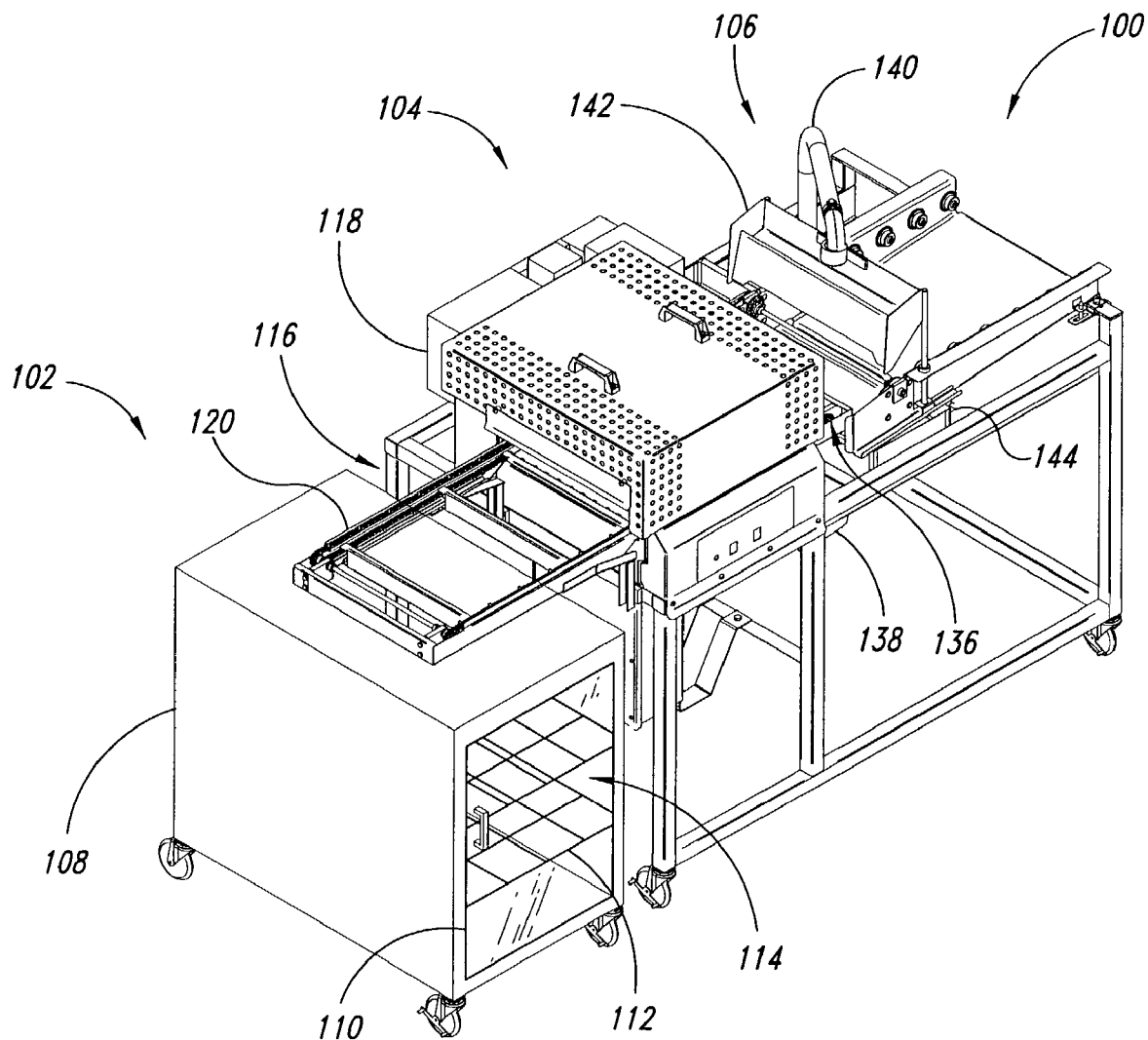
FIG. 1 is a front isometric view of a system for thawing, heating, and/or glazing donuts or baked goods according to one embodiment of the present invention.
Figure 2:
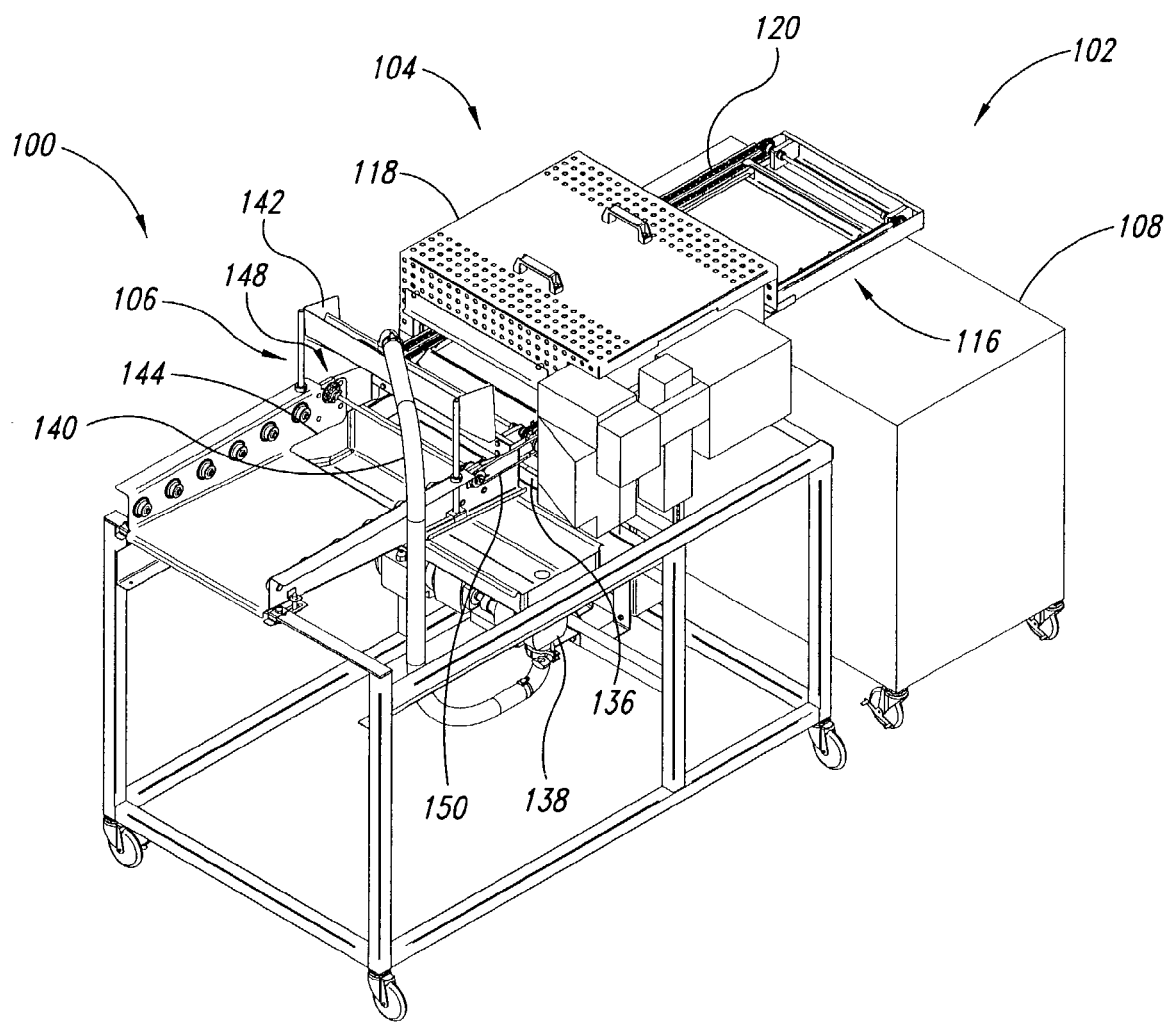
FIG. 2 is a rear isometric view of the system of FIG. 1.
Figure 3:
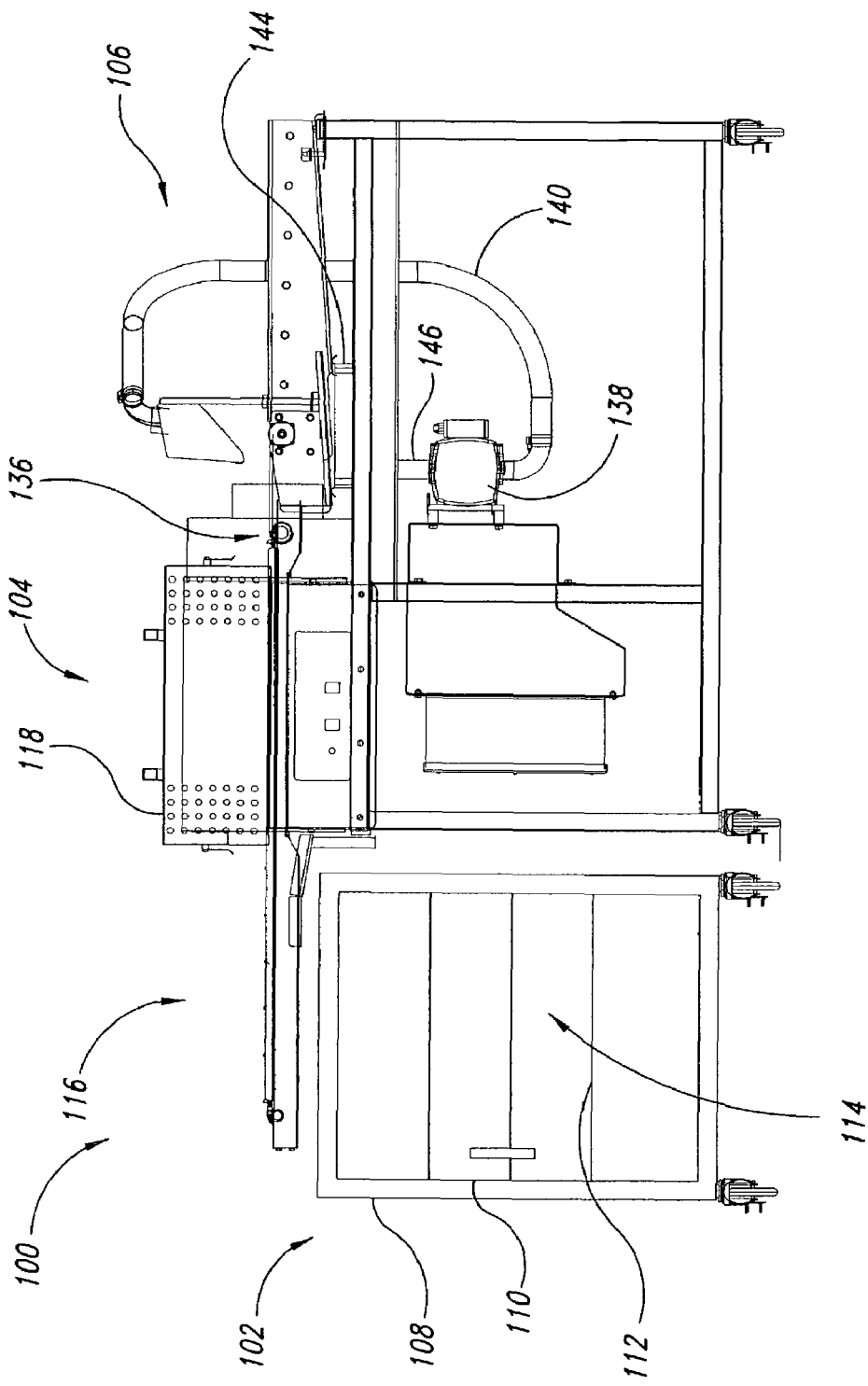
FIG. 3 is a front elevation view of the system of FIG. 1.

FIGS. 1 through 3 illustrate a system 100 for thawing, heating, and glazing donuts. In general, the system 100 incorporates a thawer 102, a conveyor oven 104, and a glazer 106. As described in more detail below, the inventive thawer 102 is configured to thaw donuts, the inventive conveyor oven 104 is configured to heat the donuts, and the inventive glazer 106 can be positioned and configured to apply glaze to the donuts after they leave the oven and while the surface temperature of the donuts is between 160 and 180° F.

The illustrated thawer 102 is an independent unit that is sized and configured to roll into and out of position with the remaining portion of the system 100. The inventors appreciate that the thawer 102 can be an integral part of the system 100, or can be a completely independent element, which would allow the thawer to have a wide variety of sizes, shapes, and capacities. The illustrated thawer can be purchased from Belshaw Brothers of Seattle, Wash. in make and model no. TZ6. One of ordinary skill in the art will immediately appreciate that other makes and models of thawers can be substituted therefor, and that many aspects of the illustrated thawer 102 can be modified without deviating from the spirit of the invention. For example, the thawer could be automated, as opposed to being manually loaded and unloaded.

The illustrated thawer 102 generally incorporates a housing 108, a door 110, and several internal shelves 112. The shelves 112 can be sized and shaped to support a standard, rigid glazing screen. Similarly, the interior wall of the thawer 102 can be fixed with supports onto which a standard glazing screen can be slid. In either case, a standard glazing screen can be inserted into an removed from the thawer 102 for thawing donuts.

In the illustrated embodiment, the thawer 102 has an interior cavity 114. During operation, the cavity 114 can be heated to a temperature ranging from 80° F. to 100° F., although a temperature of about 95° F. is preferred. Similarly, the relative humidity during operation can range between 60% and 80% preferably about 70%. The door 110 on the thawer 102 can be manually opened and closed to provide access to the interior cavity 114 and to insert or remove donuts therefrom. In alternate embodiments, different types of doors can be incorporated into the thawer 102, such as louver-type doors, as generally understood in the arts.

In a typical situation, a glazing screen carrying several donuts is inserted into the thawer 102 at a desired temperature and humidity, and the donuts are left in the thawer to thaw for at least 20 min. One advantage of the present invention, however, is that when the operator is not able to remove the donuts at that particular time, the thawer 102 will retain the donuts in their thawed and moist state for five hours, six hours, or more. Consequently, the present invention allows donuts to be thawed in as little as 20 min., or stored in a thawed state for as much as 5, 6 or more hours, without adversely affecting the quality or desirability of the donuts. The inventive environment for thawing the donuts can actually add moisture to the donuts—as opposed to the prior art methods which tended to dry out the donuts—making them even more desirable.

The conveyor oven 104 consists generally of a track assembly 116 and an impinger oven 118. The track assembly 116 and the radiant oven 118 are similar to a prior art pizza oven. In the illustrated embodiment, the impinger oven 118 is a modified Lincoln brand, selected from Models 1301, 1302 or 1313, rated at 208, 240 and 400/230 Volts, respectively. The impinger oven 118 can be set at a temperature between about 375° F. and 450° F., preferably about 425° F. An individual of skill in the relevant art will appreciate after reviewing the present disclosure that there are other types of ovens and other settings that can be substituted for the illustrated embodiment, all without deviating from the spirit of the invention.

Figure 4:
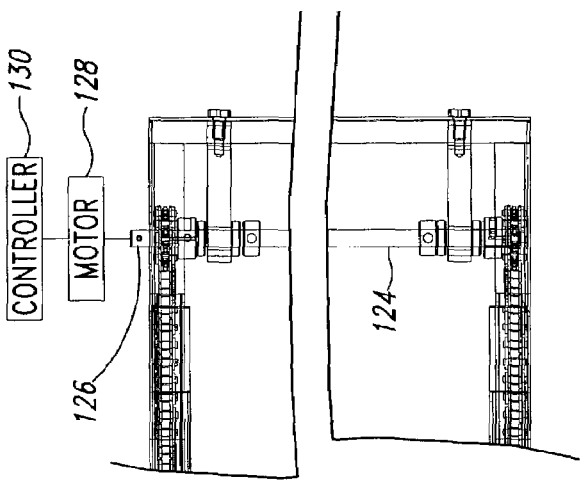
FIG. 4 is a plan view of a conveyor for the system of FIG. 1, according to one embodiment of the present invention.
Figure 4:
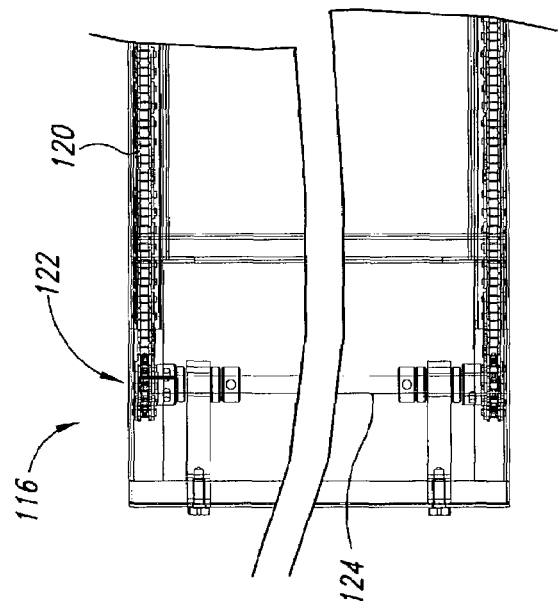
Figure 5:
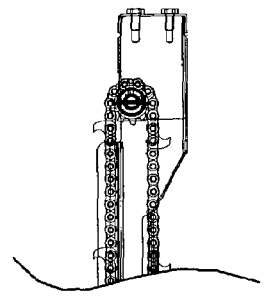
FIG. 5 is an elevation view of the conveyor of FIG. 4.
Figure 5:
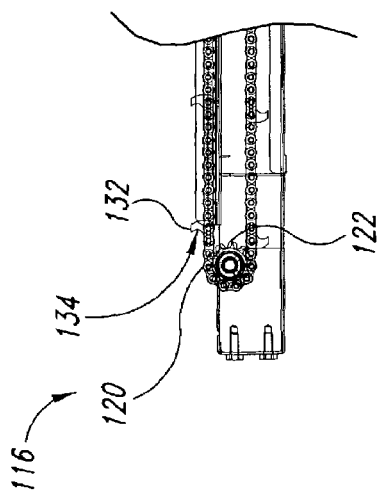

The track assembly 116 of the present invention does not incorporate a mesh screen or belt, as used in the prior art or in the unmodified versions of the above-listed ovens. Instead, the mesh screen has been removed from the oven and replaced with a pair of opposing chains 120; between the two chains 120, there is a void. One particular embodiment of the chain 120 is best illustrated in FIGS. 4 and 5. Each chain 120 extends around a pair of opposing end gears 122. In the illustrated embodiment, each end gear 122 from one of the two chains 120 is connected by a lateral shaft 124 to the corresponding end gear in the opposing chain to rotate in unison. Thus, the chains 120 move at least substantially in unison to drive a glazing screen through the impinger oven 118 in a fixed orientation. The inventors appreciate that additional gears can be positioned between the end gears 122 without deviating from the spirit of the invention.

The rightmost lateral shaft 124, as viewed in FIG. 4, is connected to a coupling 126. The coupling 126 is driven by a motor 128 during operation, which in turn is controlled by a controller 130. The system can be configured to drive the chains 120 at a desired rate to move the donuts through the oven over a desired duration of time and transmit the appropriate amount of heat to the donuts. As indicated below, other adjustments can be made to the system to cause the desired amount of heat to be transmitted to the donuts.

Lateral projections 132 are attached to the chain 120 at several locations along the length of each chain. As illustrated in FIG. 5, the lateral projections are oriented outward from the loop of the chain 120 such that the lateral projections project upward from the uppermost length of chain to engage a glazing screen during operation. Each lateral projection 132 has a concave rearward surface 134 designed to prevent inadvertent slippage of the glazing screen past the lateral projection. Because the concave rearward surface 134 is oriented toward the user when the user urges the glazing screen against the chain 120, the concave rearward surface will prevent the glazing screen from slipping beyond the lateral projection, thus preventing the donuts from being prematurely inserted into the oven or inserted further into the oven than desired.

In another embodiment of the present invention, the controller 130 is configured to start the motor 128 and move the chain 120 only after the impinger oven 118 has reached its desired temperature. This, alone and in combination with the lateral projections 132, can prevent operators from inserting baked goods into the oven before the oven is ready, and from inserting the glazing screen further into the oven than desirable.

Referring back to FIGS. 1 through 3, the glazer 106 is positioned downstream of the impinger oven 118. A downstream termination point 136 of the chain 120 is located upstream of the glazer 106 to prevent glaze from contacting the chain. This separation can reduce or eliminate the possibility that glaze is brought back into the oven by the chain and burned.

The glazer 106 generally incorporates a pump 138, a delivery hose 140, a distributor 142, a collection basin 144, and a return hose 146. The pump 138 in the illustrated embodiment can be purchased from Flowtech under the Unibloc-GP brand, with model number "Unibloc-GP-275-15/15." An individual of skill in the art having reviewed this disclosure will appreciate that other pumps can be substituted for the illustrated pump 138 without deviating from the spirit of the inventions.

During operation, glaze in the collection basin 144 is routed by gravity through the return hose 146 to the pump 138. When operating, the pump 138 delivers glaze via the delivery hose 140 to the distributor 142. Glaze in the distributor 142 spreads along at least substantially the entire width of the track assembly 116, and cascades downward from the distributor into the collection basin 144. As glazing screens carrying donuts pass under the distributor 142, glaze is poured over each of the donuts.

The inventors have determined that the application of glaze is optimal when the surface temperature of the donut is between 160 and 180° F., inclusive. Accordingly, the invention is configured such that the temperature of the impinger oven 118, the speed of the chain 120, and the spacing between the oven and the distributor 142 can all be controlled and/or adjusted, independently and in combination, such that when the donuts pass under the distributor, the surface temperature of each donut is within the desired range.

Also, because the donuts pass through the system on a glazing screen, the glazing screen is also hot when it passed under the distributor 142. Consequently, glaze cascading over the glazing screen does not collect on the glazing screen, but instead drips off the glazing screen in large part. This configuration creates optimal donut glazing while minimizing glaze consumption. The prior art systems sometimes glazed the donuts when they were too hot, resulting in glaze run-off and insufficient donut coverage; or glazed the donuts when they were too cold, resulting in milky and/or flaky glaze following cooling. Neither of these situations is good for the desirability and, thus, marketability of the donut.

In one embodiment of the present invention, each donut passes through the oven in approximately 2 minutes, although systems according to the invention have been successfully operated with cooking times as low as 90 seconds and as high as 3 minutes. The inventors appreciate that the temperature and time can be varied, while still meeting the needs of the present invention.

Figure 6:
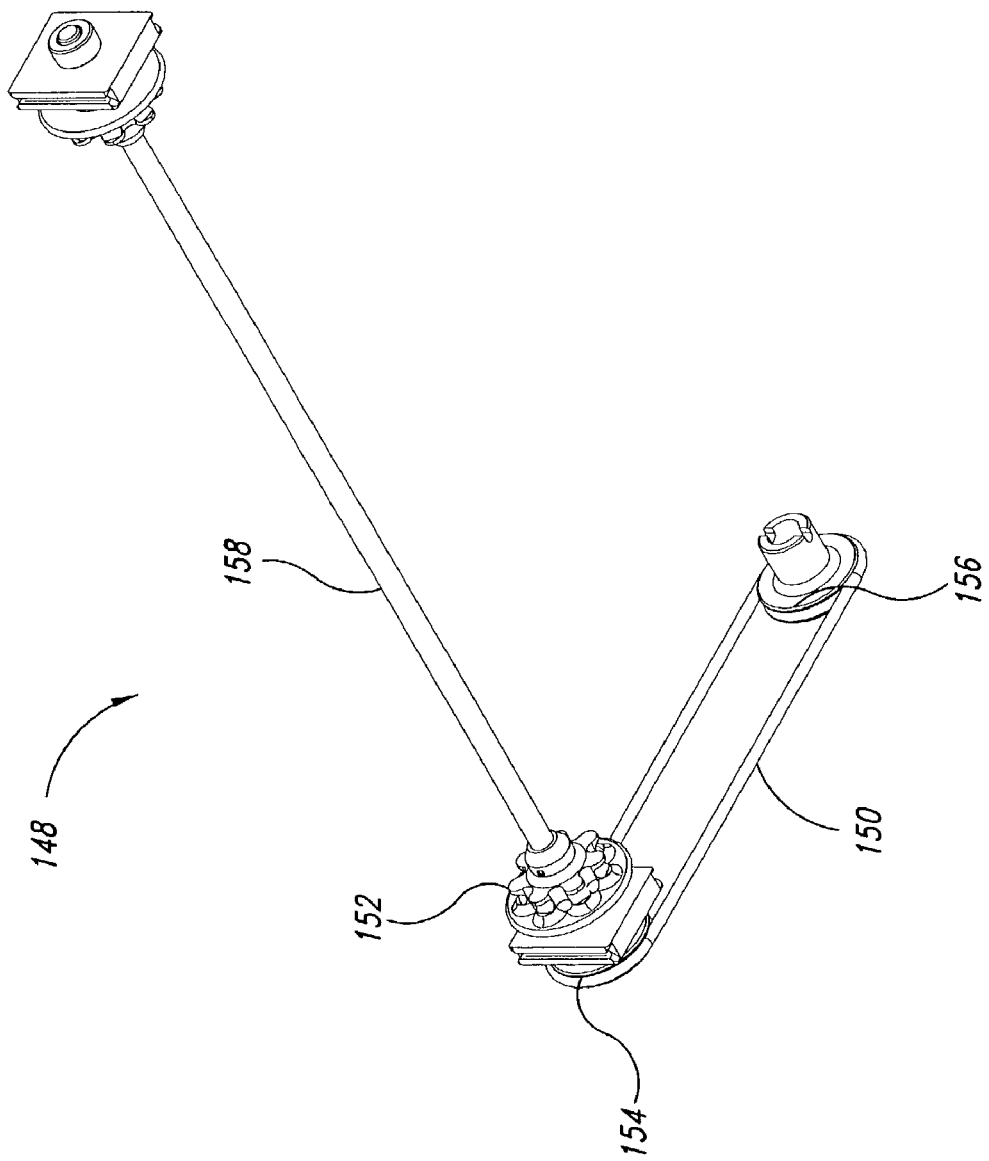
FIG. 6 is an isometric view of a glazing screen drive gear assembly according to one embodiment of the present invention.
Figure 7:
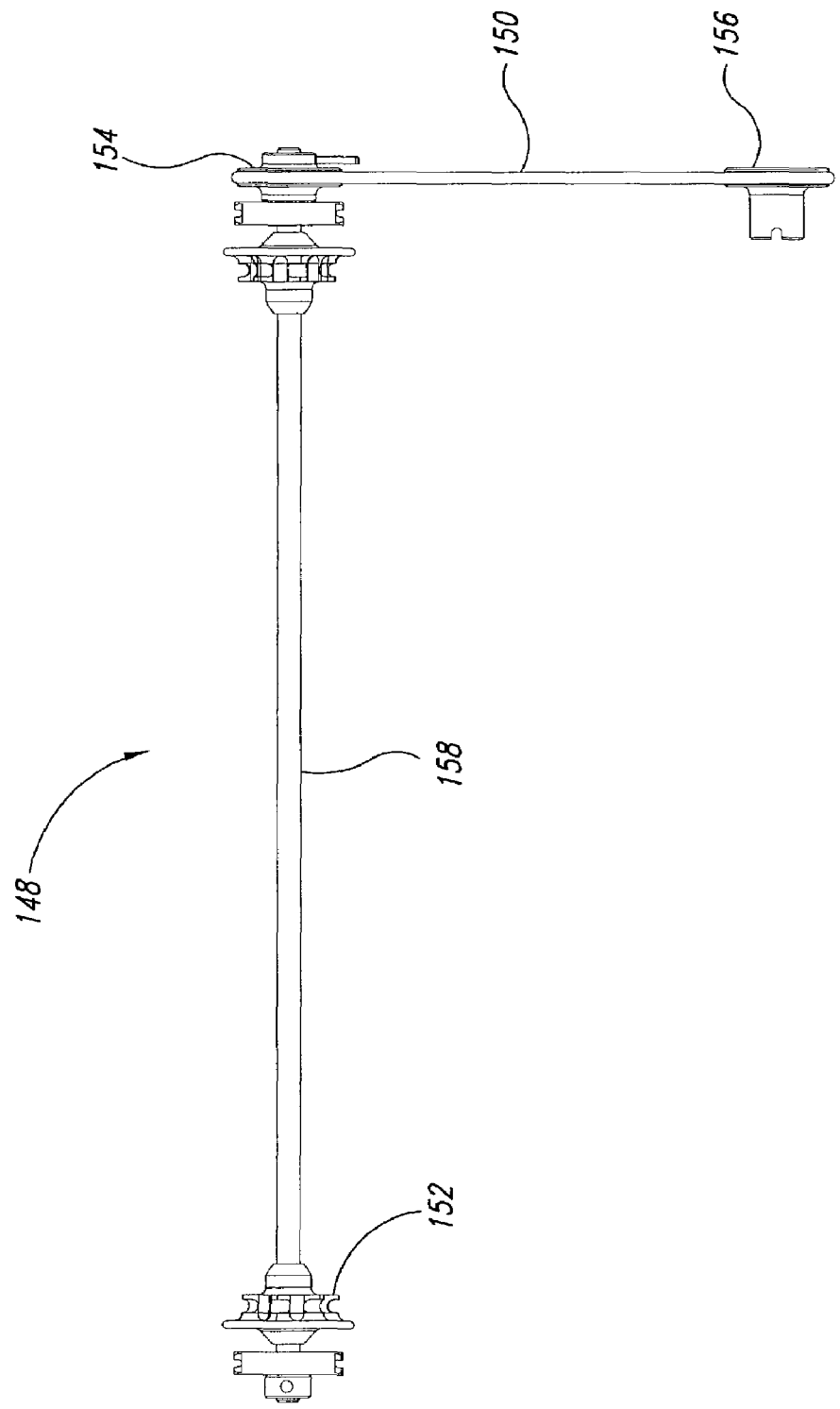
FIG. 7 is a plan view of the glazing screen drive assembly of FIG. 6.

FIGS. 6 and 7 illustrate a secondary drive assembly 148 according to one embodiment of the present invention. The secondary drive assembly 148 receives the glazing screen after it passes underneath the glaze distributor 142, and propels the glazing screen through the remainder of the system, either alone or in combination with the chain 120. As illustrated in FIG. 2, the secondary drive assembly 148 is coupled by a belt 150 to a pulley mounted to the coupling 126 of the track assembly 116. As a result, depending on the relative pulley sizes, the secondary drive assembly 148 and the track assembly 116 can be configured to drive the glazing screen at the same rate.

Returning to FIGS. 6 and 7, the secondary drive assembly 148 comprises a pair of opposing drive gears 152, a driven pulley 154, and a drive pulley 156, referenced immediately above. The drive pulley 156 is coupled to the driven pulley 154 by the belt 150. The driven pulley 154 is rotatably fixed to a shaft 158, which couples together the two opposing drive gears 152, and which causes the drive gears to rotate in unison.

Figure 8:
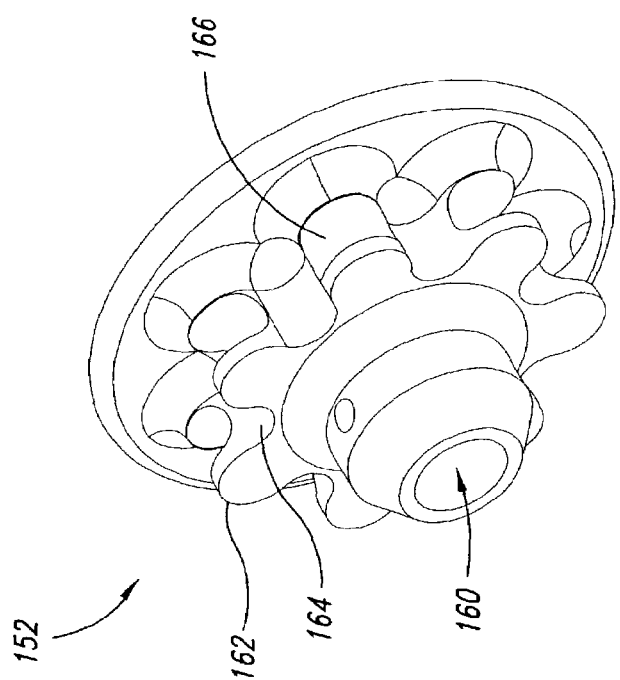
FIG. 8 is an isometric view of a glazing screen drive gear from the assembly of FIG. 6.
Figure 10:
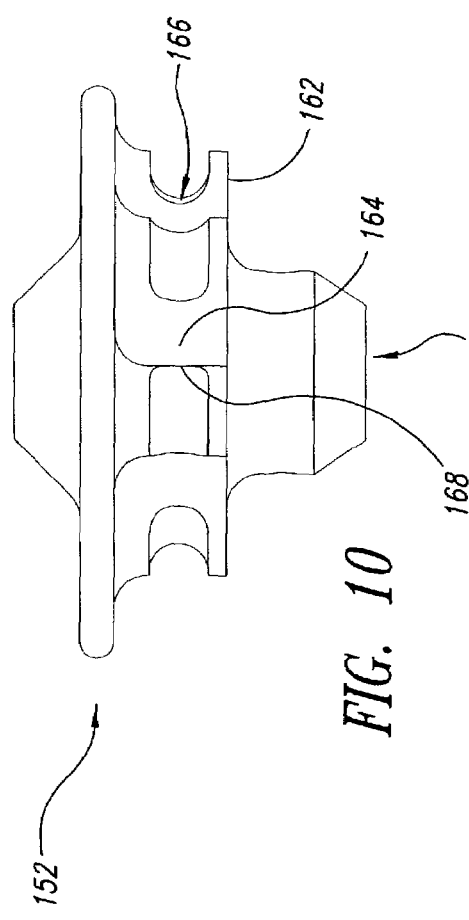
FIG. 10 is a radial view of the glazing screen drive gear of FIG. 8.
Figure 9:
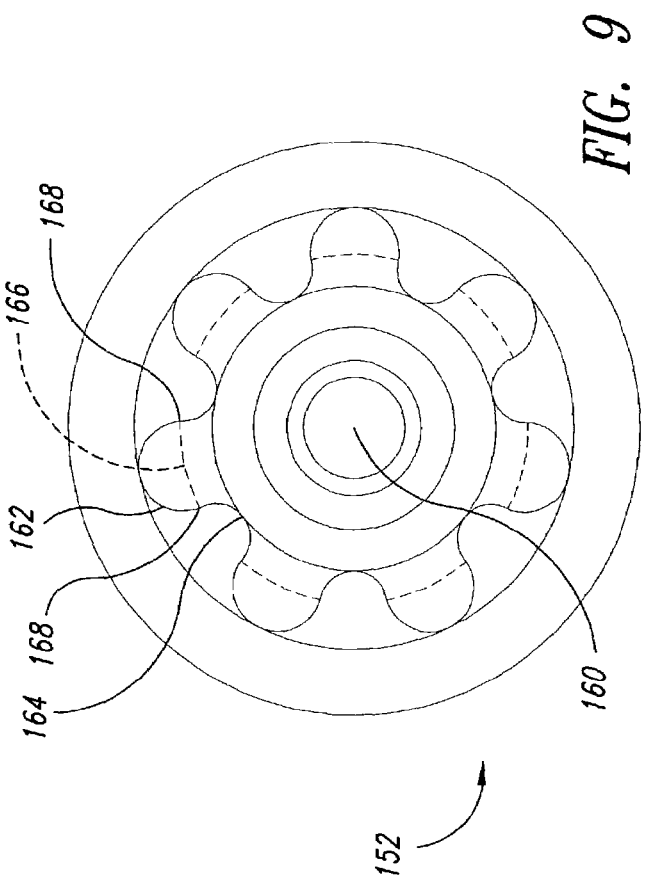
FIG. 9 is an axial view of the glazing screen drive gear of FIG. 8.

FIGS. 8 through 10 further illustrate the drive gear 152 according to one embodiment of the present invention. Each drive gear has a central opening 160 that engages the shaft 158. Radially outward of the central opening 160 are several outwardly extending radial projections 162. On opposing sides of each radial projection 162 are a pair of radial depressions 164. On the outermost surface of each radial projection 162 there is a circumferential groove 166. The ends of each circumferential groove 166 intersect the outer surface of the radial projection 162 at a pair of opposing corners 168.

In the illustrated embodiment, the concave curvature of the circumferential groove 16 (oriented axially with respect to the drive gear 152) is curved to mate with a structural member on the glazing screen. Consequently, when the glazing screen is positioned on the secondary drive assembly 148, one edge member of the glazing screen is positioned within one of the circumferential grooves 166 on one of the drive gears 152, while the opposing edge of the glazing screen is positioned within one of the circumferential grooves on the opposing drive gear. This engagement may retain the glazing screen in the desired orientation, and may retain the structural members of the glazing screen in contact with the corners 168 as the drive gears 152 rotate.

As the drive gears 152 rotate during use, the corners 168 sequentially exert point loads on the structural members of the glazing screen, thus creating the maximum friction force between the two bodies. This maximum friction force causes the drive gear 152 to exert the maximum driving force possible onto the glazing screen. Thus, even if residual glaze is being carried by the glazing screen, the drive gear 152 may be able to continue propelling the glazing screen along its course. Further, the depressions 164 between the radial projections 162 and the circumferential grooves 166 provide channels through which glaze can pass away from the drive gears 152.

In addition, as the drive gear 152 rotates and drives the glazing screen along its course, the complex surface profile of the drive gear causes the glazing screen to move up and down (as viewed in FIG. 3). Thus, any frictional resistance in the system is reduced because when the glazing screen is in the raised position, as the number of contact points between the glazing screen and the system is minimized.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A track for conveying a rigid screen in a direction of travel into an oven, the track comprising:
   an elongated, flexible loop configured to be engaged with at least two rotatable end members in the proximity of the oven to create a continuous loop extending at least partially through the oven; and
   a plurality of projections spaced apart from each other along a length of the loop, the projections oriented to project outward from the loop when the loop is engaged with the end members such that the lateral projections impinge against the rigid screen when the rigid screen is resting on the loop to prevent excessive longitudinal sliding of the rigid screen with respect to the track, at least some of the projections having a concave surface facing opposite the direction of travel to prevent premature sliding of the rigid screen over the projection and into the oven.

2. The track of claim 1 wherein the projections are also configured to drive the rigid screen into the oven as the loop moves around the two rotatable end members.

3. The track of claim 1 wherein the elongated, flexible loop comprises a chain.

4. The track of claim 1 wherein the elongated, flexible loop comprises a metal chain.

5. The track of claim 1 wherein the two rotatable end members are a subset of a plurality of members.

6. A system for heating baked goods, the system comprising:
   an oven having a passageway extending therethrough;
   a track configured in an elongated, flexible loop engaged with at least two rotatable end members, the end members being in the proximity of the oven to create a continuous loop of a track extending at least partially through the passageway; and
   a plurality of projections spaced apart from each other along a length of the loop, the projections projecting outward from the loop such that the lateral projections will impinge against a rigid screen being inserted into the oven, and will prevent excessive relative longitudinal movement of the rigid screen with respect to the track, at least some of the projections having a concave surface facing opposite a direction of travel of the track whereby the rigid screen cannot be prematurely inserted into the oven.

7. The system of claim 6, further comprising another track spaced apart in parallel alignment with the track.

8. The system of claim 6 wherein the oven temperature, the length of the passageway and the rate of travel of the track are selected such that the baked goods exit the oven having a surface temperature of at least 160 degrees Fahrenheit.

9. The system of claim 6 wherein the oven temperature, the length of the passageway and the rate of travel of the track are selected such that the baked goods exit the oven having a surface temperature of at least 180 degrees Fahrenheit.

10. The system of claim 6, further comprising a glazing applicator positioned downstream of the oven in a driving direction of the track, the glazing applicator being spaced apart from the oven by a selected distance to apply glaze to the baked goods when the surface temperature of the baked goods is between 160 degrees Fahrenheit and 180 degrees Fahrenheit, inclusive.

* * * * *